(12) United States Patent
Waris et al.

(10) Patent No.: US 9,237,220 B2
(45) Date of Patent: Jan. 12, 2016

(54) METHOD AND APPARATUS FOR PROVIDING COLLABORATIVE CONTEXT DATA SENSING AND COMMUNICATIONS

(75) Inventors: Heikki Pekka Waris, Helsinki (FI); Harri Paloheimo, Espoo (FI); Jinfeng Zhang, Espoo (FI); CanFeng Chen, Beijing (CN); Jukka Kalevi Nurminen, Espoo (FI); Jussi Pekka Olavi Ruutu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 474 days.

(21) Appl. No.: 13/635,508

(22) PCT Filed: Mar. 28, 2011

(86) PCT No.: PCT/CN2011/072225
§ 371 (c)(1),
(2), (4) Date: Sep. 17, 2012

(87) PCT Pub. No.: WO2011/116709
PCT Pub. Date: Sep. 29, 2011

(65) Prior Publication Data
US 2013/0012220 A1 Jan. 10, 2013

(51) Int. Cl.
*G06F 15/177* (2006.01)
*H04M 1/725* (2006.01)
(Continued)

(52) U.S. Cl.
CPC ............ *H04M 1/72569* (2013.01); *H04L 12/12* (2013.01); *H04L 67/2861* (2013.01);
(Continued)

(58) Field of Classification Search
CPC ............ G06F 1/3203; G06F 17/30867; G06F 17/3087; G06F 17/30873; H04M 1/72569; H04M 1/72572; H04L 67/18; H04L 67/2861; H04L 67/325; H04L 67/32; H04L 12/12; H04W 4/20; H04W 4/206; H04W 84/18
USPC ........................................................ 713/502
See application file for complete search history.

(56) References Cited

U.S. PATENT DOCUMENTS 6,859,831 B1   2/2005   Gelvin et al.
7,738,413 B2   6/2010   Varaiya et al.
(Continued)

FOREIGN PATENT DOCUMENTS

CN   1509561 A   6/2004
CN   1809013 A   7/2006
(Continued)

OTHER PUBLICATIONS

"Wireless Sensor Network", Wikipedia, Retrieved on Sep. 5, 2013, Webpage available at : http://en.wikipedia.org/wiki/Wireless_sensor_network.
(Continued)

*Primary Examiner* — Dennis M Butler
(74) *Attorney, Agent, or Firm* — Alston & Bird LLP

(57) ABSTRACT

An approach is provided for collaborative context data sensing and communications. A context platform determines context data from a plurality of devices. The context platform processes and/or facilitates a processing of the context data to determine scheduling information for causing, at least in part, a sensing, a transmission, or a combination thereof of additional context data by at least one of the plurality of devices. The context platform then determines the additional context data based, at least in part, on the scheduling information.

20 Claims, 10 Drawing Sheets

(51) Int. Cl.
  *H04L 12/12* (2006.01)
  *H04W 4/20* (2009.01)
  *H04L 29/08* (2006.01)
  *G06F 1/32* (2006.01)

(52) U.S. Cl.
  CPC ......... *H04L67/325* (2013.01); *H04M 1/72572* (2013.01); *H04W 4/20* (2013.01); *H04W 4/206* (2013.01); *G06F 1/3203* (2013.01)

(56) References Cited

U.S. PATENT DOCUMENTS

| | | |
|---|---|---|
| 2005/0003804 A1* | 1/2005 | Huomo et al. ............. 455/414.1 |
| 2005/0136994 A1* | 6/2005 | Bahl et al. .................... 455/574 |
| 2006/0229083 A1 | 10/2006 | Redi |
| 2007/0014264 A1 | 1/2007 | Davis |
| 2007/0109987 A1 | 5/2007 | Kohlmann et al. |
| 2007/0226351 A1 | 9/2007 | Fischer et al. |
| 2008/0052340 A1 | 2/2008 | Hallmark |
| 2008/0088462 A1 | 4/2008 | Breed |
| 2008/0259919 A1* | 10/2008 | Monga ......................... 370/389 |
| 2009/0096604 A1 | 4/2009 | Battista |
| 2009/0180451 A1 | 7/2009 | Alpert et al. |
| 2010/0105351 A1 | 4/2010 | Xu et al. |
| 2010/0331017 A1 | 12/2010 | Ariga |
| 2011/0014933 A1* | 1/2011 | Karmarkar et al. .......... 455/466 |

FOREIGN PATENT DOCUMENTS

| | | |
|---|---|---|
| CN | 101350828 A | 1/2009 |
| CN | 101715201 A | 5/2010 |
| EP | 1594037 A2 | 11/2005 |
| WO | 02/093877 A1 | 11/2002 |
| WO | 2004/021613 A1 | 3/2004 |
| WO | WO 2009/118012 A1 | 10/2009 |
| WO | 2010/102835 A1 | 9/2010 |
| WO | 2010/115289 A1 | 10/2010 |

OTHER PUBLICATIONS

International Search Report and Written Opinion received for corresponding International Patent Application No. PCT/CN2011/072225, dated Jul. 14, 2011, 16 pages.

Ye et al., *An Energy-Efficient MAC Protocol for Wireless Sensor Networks*, USC/ISI Technical Report ISI-TR-543 (Sep. 2001) pp. 1-10.

* cited by examiner

FIG. 5B

Configuration

Minimal Upload Period: 10 s

Repository address: 210.112.128.51

Repository port: 8888

Save    Cancel

FIG. 5A

Please select the context data to upload:

☐ Location
☐ Temperature
☐ Light
☐ Humidity
☐ Oxygen
☐ CO2

Save    Cancel

METHOD AND APPARATUS FOR PROVIDING COLLABORATIVE CONTEXT DATA SENSING AND COMMUNICATIONS

CROSS-REFERENCE TO RELATED APPLICATIONS

This application is a national stage entry of PCT Application No. PCT/CN2011/072225, filed Mar. 28, 2011, the contents of which is hereby incorporated by reference.

BACKGROUND

Service providers and device manufacturers (e.g., wireless, cellular, etc.) are continually challenged to deliver value and convenience to consumers by, for example, providing compelling network services. One area of interest has been the development of context-aware applications (e.g., applications that rely on context data collected via sensors deployed in, on, and/or around mobile devices). As such sensors become more common, there may be many mobile devices that are sensing and/or otherwise collecting context data about the same target. Accordingly, service providers and device manufacturers face significant technical challenges to leveraging the availability of growing number of context-sensing devices to improve context data and implement innovative context-aware applications.

SOME EXAMPLE EMBODIMENTS

Therefore, there is a need for an approach for efficiently providing collaborative context data sensing and communication among a group of context sensing devices.

According to one embodiment, a method comprises determining context data from a plurality of devices. The method also comprises processing and/or facilitating a processing of the context data to determine scheduling information for causing, at least in part, a sensing, a transmission, or a combination thereof of additional context data by at least one of the plurality of devices. The method further comprises determining the additional context data based, at least in part, on the scheduling information.

According to another embodiment, an apparatus comprises at least one processor, and at least one memory including computer program code for one or more programs, the at least one memory and the computer program code configured to, with the at least one processor, cause, at least in part, the apparatus to determine context data from a plurality of devices. The apparatus is also caused to process and/or facilitate a processing of the context data to determine scheduling information for causing, at least in part, a sensing, a transmission, or a combination thereof of additional context data by at least one of the plurality of devices. The apparatus is further caused to determine the additional context data based, at least in part, on the scheduling information.

According to another embodiment, a computer-readable storage medium carries one or more sequences of one or more instructions which, when executed by one or more processors, cause, at least in part, an apparatus to determine context data from a plurality of devices. The apparatus is also caused to process and/or facilitate a processing of the context data to determine scheduling information for causing, at least in part, a sensing, a transmission, or a combination thereof of additional context data by at least one of the plurality of devices. The apparatus is further caused to determine the additional context data based, at least in part, on the scheduling information.

According to another embodiment, an apparatus comprises means for determining context data from a plurality of devices. The apparatus also comprises means for processing and/or facilitating a processing of the context data to determine scheduling information for causing, at least in part, a sensing, a transmission, or a combination thereof of additional context data by at least one of the plurality of devices. The apparatus further comprises means for determining the additional context data based, at least in part, on the scheduling information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-23, 48-70, and 75-77.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A and 5B are diagrams of user interfaces utilized in the processes of FIGS. 3 and 4, according to various embodiments;

DESCRIPTION OF SOME EMBODIMENTS

Examples of a method, apparatus, and computer program for providing collaborative context data sensing and communications are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
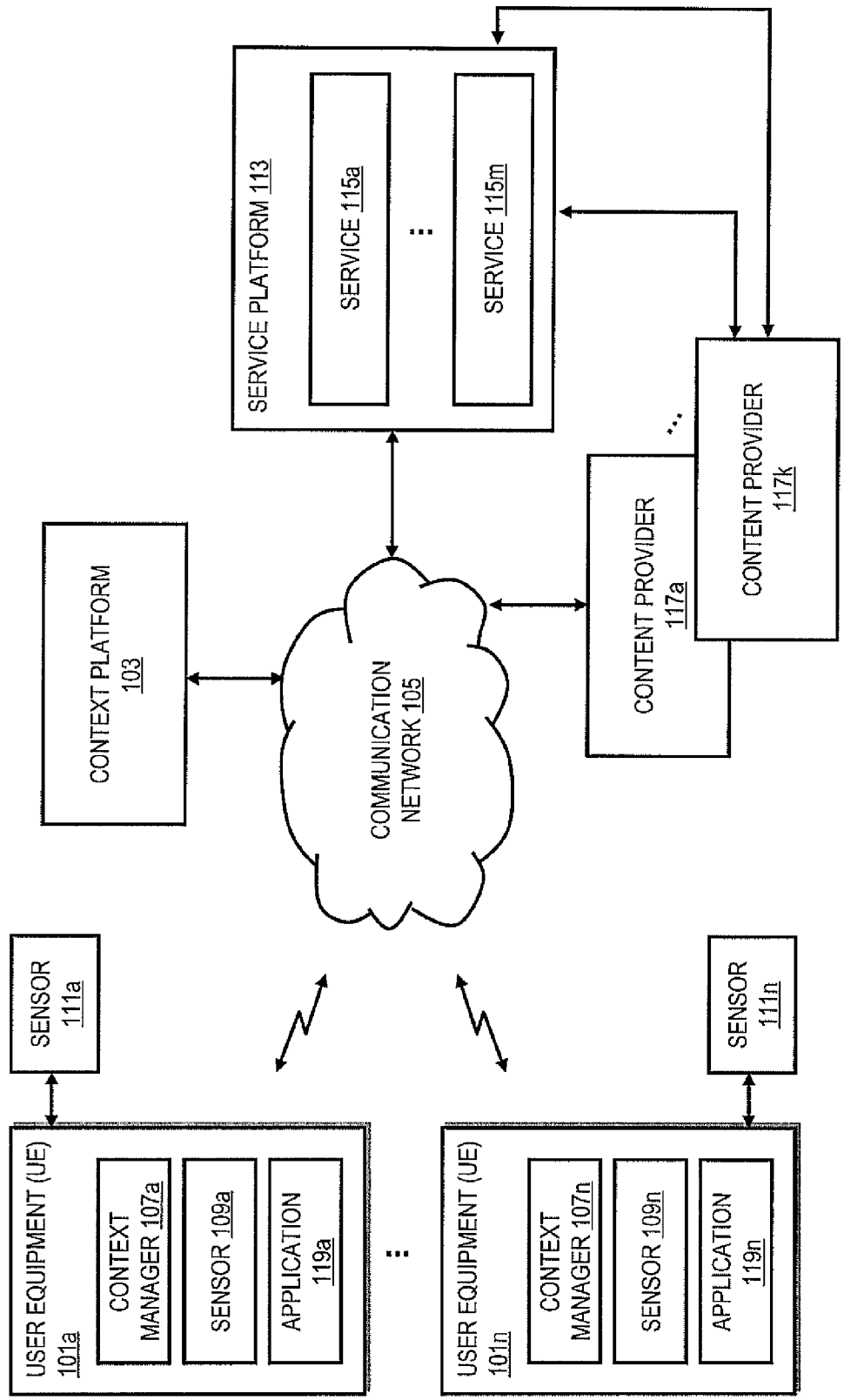
FIG. 1 is a diagram of a system for providing collaborative context data sensing and communications, according to one embodiment.

FIG. 1 is a diagram of a system for providing collaborative context data sensing and communications, according to one embodiment. As noted previously, there may be many mobile devices that are sensing and/or uploading the same context data in the same location at the same time. Even with traditional approaches to optimization (e.g., focused on optimizing context data collection on a device-by-device basis), redundancy still exists among the context data sensed and/or transmitted (e.g., reported) by different mobile devices. In many cases, such redundancy can cause significant waste of, for instance, processing, network, and/or energy resources of the devices and/or any other participating components (e.g., servers, sensors, etc.).

In some cases, the redundancy and lack of coordination among mobile devices during context sensing can also prevent the devices from achieving a desired quality level. For example, sometimes multiple mobile devices are sensing and/or uploading (e.g., sharing) context data about the same target (e.g., same location). However, any single device cannot sense and/or transmit the collected context or sensor data at a specified fidelity due to limited resources and/or capabilities.

To address these problems, a system 100 of FIG. 1 introduces the capability to collect and analyze context data reported by multiple devices (e.g., user equipment (UEs) 101a-101n, also collectively referred to as UEs 101) to schedule or coordinate when the individual UEs 101 sense and/or transmit their respective context data. More specifically, the system 100 processes the collected context data to select a list of the UEs 101 as candidates for sensing and/or uploading a specified type of sensor or context data. In one embodiment, the system 100, for instance, calculates a sensing and transmission (e.g., uploading or sharing) schedule for the candidate UEs 101, and sends the schedules to the candidate UEs 101. In one embodiment, on receiving the schedules, the respective candidate UEs 101 performs the sensing and uploading of additional context data according to the schedule. The context data is then collected to support, for instance, one or more context aware services and/or applications available in the system 100.

In one embodiment, the system 100 can separate or otherwise subdivide a volume of space (e.g., a geographical volume at a location) into one or more sub-spaces that can potentially correlate to data sensing targets. In some embodiments, every point in the volume of space (e.g., a three-dimensional space) can be identified by three coordinates (e.g., longitude, latitude, and height). By way of example, such a coordinate system can also be Cartesian, polar, cylindrical, spherical or any other coordinate system for representing three-dimensional space without departing from the spirit or the scope of the present invention. The volume of space can then be subdivided based, at least in part, on the coordinates. In one embodiment, the sub-space is defined in the shape of a cube. However, it is contemplated that any other shape may be used or defined, e.g. based on the nature of the used coordinate system. With respect to the cube, the system 100 identifies each cube by a center point and size. For example, the center point's coordinates indicate the cube's location. In one embodiment, the target for collaborative data sensing can then be defined in space as one or more of the cubes.

In another embodiment, the system 100 can control the granularity of the context data by specifying the sizes of the sub-spaces or cubes. For example, smaller sizes for the sub-spaces or cubes can provide higher granularity when sensing a particular target, whereas larger sizes reduces granularity. For example, in one sample use case where the system is providing collaborative sensing of temperature data at a particular location, specifying smaller target subspaces or cubes can provide for a higher granularity of the reported temperatures. In certain embodiments, the sizes of individual subspaces or cubes can vary and need not be uniform across all subspaces. Yet, in other embodiments the individual sub-spaces may be defined using different shapes and/or coordinate systems.

In yet another embodiment, the system 100 can generate the scheduling information for collaborative data sensing on a sub-space or cube basis. In other words, scheduling information is generated for each target cube. In one embodiment, the system 100 can apply different scheduling algorithm depending on the context information (e.g., the number of UEs 101 currently within a cube, the rate of turnover among the UEs 101—UEs 101 entering or exiting the cubes, etc.) associated with the cube or sub-space. In this way, depending on nature of the sensing target and/or the context data type to sense, the system 101 can specify different combinations of UEs 101, sensing frequencies, uploading frequencies, etc. to meet, for instance, target requirements for the resulting context data set.

As shown in FIG. 1, the system 100 comprises the UEs 101 having connectivity to a context platform 103 over a communication network 105. In one embodiment, the context platform 103 is a server that analyzes the collected context data to generate scheduling information that is used by the UEs 101 to collect subsequent or additional context data. In the example of FIG. 1, the UEs 101a-101n include respective context managers 107a-107n (also collectively referred to as context managers 107) for receiving scheduling information from the context platform 101 to coordinate the collection of respective internal sensors 109a-109n (also collectively referred to as internal sensors 109) and/or external sensors 111a-111n (also collectively referred to as external sensors 111). By way of example the sensors 109 and 111 may include any sensor capable of interfacing the UEs 101. The sensors include, for instance, location sensors (e.g., Global Positioning System (GPS) sensors, proximity sensors, accelerometers, gyroscopes, etc.), environmental sensors (e.g., temperature, atmospheric pressure, light sensors, sound sensors, etc.), health and wellness sensors (e.g., electrocardiograph (ECG) sensors, photoplethysmograph (PPG) sensors, galvanic skin response (GSR) sensors, electroencephalograph (EEG) sensors, electromyography (EMG) sensors, etc.), and the like. By way of example, connectivity between the UE 101 and the sensors 109 and/or 111 can be facilitated by short range wireless communications (e.g., Bluetooth, Wi-Fi, ANT/ANT+, ZigBee, etc.).

In one embodiment, the context managers 107 can perform a portion or all of the functions of the context platform 103. For example, in embodiments where the context manager 107 performs the functions of the context platform 103, the system can operate in a peer-to-peer to provide for collaborative data sensing and communications rather than the client-server mode of operation provided via the context platform 103.

As previously discussed, the UEs 101 (e.g., context data reporters) collect context data from the internal sensors 109 and/or the external sensors 111 in and around them, and then upload or transmit such data to a central context data repository (e.g., the context platform 103) through the communication network 105. By way of example, the collected context data can be utilized to generate or otherwise support any number of context aware services and/or applications such as those provided by a service platform 113, one or more services 115a-115m (also collectively referred to as services 115) operating within the service platform 113, one or more content providers 117a-117k (also collectively referred to as content providers 117), or a combination thereof. It may also be possible that UEs 101 will receive the context data from other UEs101, or from a central data repository (e.g., the context platform 103) through the communication network 105. This may be beneficial to optimize the operation of UE 101 and/or its internal sensors 109 or external sensors 111. For example, a sensor 109 or 111 may receive parameters that allow it to calibrate itself. Alternatively, a sensor may be able to faster find the optimal range of parameters and start to produce useful measurements.

In one embodiment, the UEs 101 may also execute respective applications 119a-119n (also collectively referred to as applications 119) as clients of the service platform 113 and/or the services 115. By way of example, the applications 119 can supplement the context manager 107 and provide functions for storing, processing, and/or forwarding the sensor or context data to other components of the system 100 (e.g., the context platform 103, the service platform 113, the services 115, the content providers 117, etc.).

In one embodiment, the service 115 may include a context aware service for providing energy efficient communication proxies services. In such an embodiment, a communication proxy service 115 provides a framework wherein multiple UEs 101 are able to use collaborative context data sensing to synchronize, manage and effectively communicate their operational states amongst one another so that communications, calls and data services can be executed optimally (e.g., when communicating devices are in an online or active state during active communication sessions and offline in a low power or no power use state at other times). As such, battery usage of respective user equipment can be reserved for, or restricted to, active operations. By way of example, under the communication proxy service 115, UEs 101 such as mobile devices may operate in various states, as depicted below

| Operational State | Description |
|---|---|
| Inactive | Device is completely inoperable by the user. Power consumption/battery utilization is at its lowest. Device cannot communicate with the network to send or receive communications. |
| Idle | Device is powered on, in a low power consumption/battery utilization mode. Device can still periodically communicate with the network, such as to receive incoming calls, texts or other data. |
| Active | Device is operable by the user. Power consumption/battery utilization is higher to support the specific capabilities of the mobile device. Device can communicate with the network to send or receive communications. |

Indeed, various other operational states may apply depending on the device type in question, software design capabilities, etc. The above mentioned states are for example purposes only and not meant to limit the scope or range of applications of the examples presented herein. For example, there may numerous operational states with varying degree of energy consumption. It should be understood that typically the operational state is a trade-off between the energy consumption and the functional and/or non-functional capabilities of the UE 101. For example, the UE 101 may operate with smaller energy consumption but its processing speed is also slower. As used herein, a "wake-up" refers to any message, flag or signal that triggers the "active state" of operation of the user equipment. In addition, a "wake-up" may refer to any message, flag or signal that makes the device to go to a higher energy state, but not necessarily to the highest. In the context of mobile devices and other portable equipment, wake-up execution can be triggered by way of known signal and power modulation techniques. Regardless of the chosen method of invoking the active state of operation of a given device, it will be seen that the effective coordination of wake-ups between pluralities of user equipment desiring to engage in a mutual communication session can be performed in a manner that positively conserves overall battery usage of said equipment.

In one embodiment, the communication proxy service 115 provides means to delegate at least part of the communication functions (e.g., a phone function) to a proxy device by determining or sensing context data (e.g., location information to indicate physical proximity, profile data to indicate social proximity) associated with the participating devices. In one embodiment, the context sensing and transmission is performed collaboratively over local sensors 109 and/or 111, short range ad-hoc mobile networks employing, for instance, a low-power radios to improve energy efficiency. Example processes of the communication proxy service 115 are explained in more detail with respect to FIG. 6 and FIGS. 7A-7D below.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

By way of example, the context platform 103, the context managers 107, the UEs 101, the applications 119, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the context manager 107 and the context platform 103 may interact according to a client-server model. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2A:
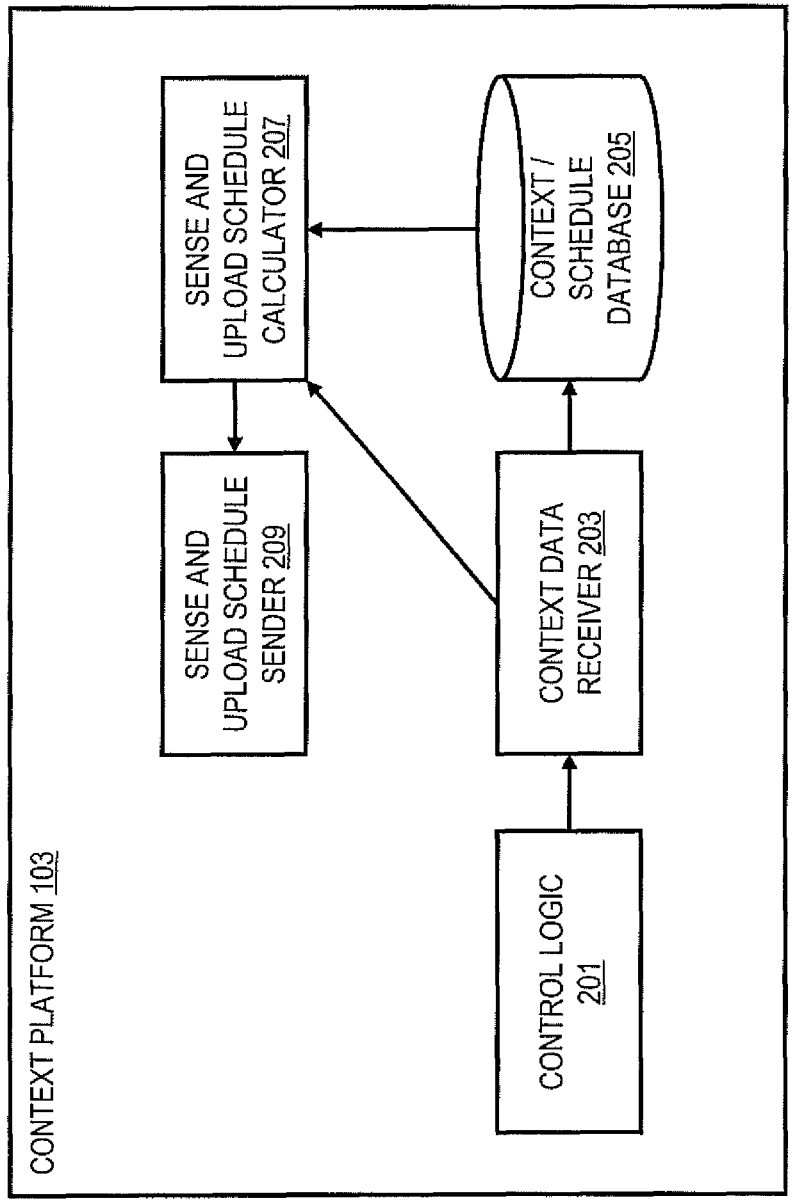
FIG. 2A is a diagram of the components of a context platform, according to one embodiment.

FIG. 2A is a diagram of the components of a context platform, according to one embodiment. By way of example, the context platform 103 includes one or more components for providing collaborative context sensing and communications. It is contemplated that the functions of these components may be combined in one or more components or performed by other components of equivalent functionality. In one embodiment, the context platform 103 includes at least a control logic 201 which executes at least one algorithm for executing functions of the context platform 103. In one embodiment, the control logic 201 interacts with a context data receiver 203 to receive context data from one or more UEs 101. The context data receiver 203 can then store the context data in, for instance, the context/schedule database 205. In this example, the context data receiver 203 serves as the storage means for context data received from the UEs 101 that interact with the context platform 103.

The sense and upload schedule calculator 207 can then process the context data to determine scheduling information for the UEs 101 to sense context data and then upload or transmit that data to the context platform 103. In one embodiment, the scheduling information includes, at least in part, a schedule for collecting the context data (e.g., a sensing or sampling frequency), as well as a schedule for when to upload the data. By way of example, the sensing schedule and the upload schedule need not be synchronized and can be determined independently to, for instance, account for device or sensor capabilities, target data requirements or criteria, context information associated with the UEs 101 (e.g., location, time, activity, etc.), context information associated with the sensing target, sensor types, etc. In one embodiment, to facilitate the decoupling of the two schedules, the sensor data are tagged with timestamp information so that data can be uploaded according to the upload frequency in the schedule and the timestamp. The sense and upload schedule sender 209 can then send this schedule to the participating UEs 101 or the respective context managers 107. Yet in another embodiment, the sense and upload schedule sender 209 can also send some context and/or sensor information to the UEs 101 to optimize the operation of UE 101 and/or its internal sensors 109 or external sensors 111.

In one embodiment, via the components and/or module described above, the context platform 103 performs one or more of the following: (1) collecting and analyzing context or sensor data uploaded by the UEs 101; (2) selecting a list of UEs 101 to participating in subsequent data sensing; (3) calculating the sense and upload schedules for the participating or candidate UEs 101; and (4) sending the schedules to the participating or candidate UEs 101. In one embodiment, the context platform 103 can direct the UEs 101 that are not participating in the collaborative context data sensing to reduce their sensing frequencies (e.g., to a low or lowest level) or, in some cases, cease to sense context data until otherwise directed.

Figure 2B:
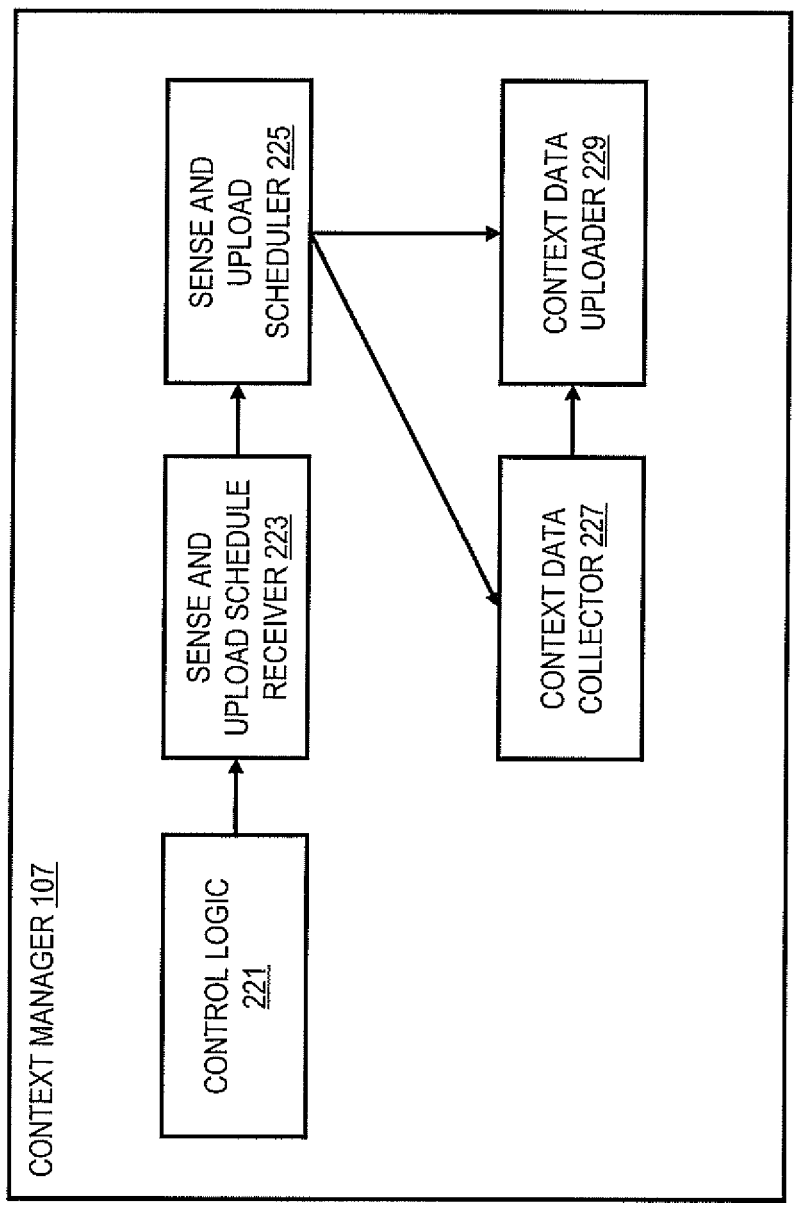
FIG. 2B is a diagram of the components of a context manager, according to one embodiment.

FIG. 2B is a diagram of the components of a context manager, according to one embodiment. By way of example, the context manager 107 includes one or more components for providing collaborative context sensing and communications. As shown in FIG. 1, the context manager 107 is a process or module of the UE 101 and provides for client side operations of the collaborative context data sensing of the various embodiments described herein. It is contemplated that the functions of these components may be combined in one or more components or performed by other components of equivalent functionality. In some embodiments, the context manager 107 may include all or a portion of the components and/or functions of the context platform 103, thereby enabling the context manager 107 to facilitate the collaborative context sensing processing using a peer-to-peer approach as well as the client-server approach described with respect to the context platform 103.

In one embodiment, the context manager 107 includes at least a control logic 221 which executes at least one algorithm for executing functions of the context manager 107. In one embodiment, the control logic 201 interacts with a sense and upload schedule receiver 223 which receives scheduling information from the context platform 103 to provide for collaborative context data sensing and transmissions. The sense and upload schedule receiver 223 then interacts with the sense and upload scheduler 225 that controls the operation of a context data collector 227 and context data uploader 229 according to the received schedule information. In one embodiment, the context data collector 227 controls and collects context data from the sensors 109 and/or 111 in, around, or otherwise associated with a corresponding UE 101. The context data uploader 229 then uploads the collected context data to the context platform 103. As noted above, the context data collector 227 and the context data uploader 209 may operate on separate (e.g., asynchronous) schedules whereby data sensing or collection activities take place are performed independently of the uploading or transmitting activities.

In one embodiment, the context manager 107 can be configured to direct the UE 101 and its sensors 109 and/or 111 to sense and upload context at a high frequency (e.g., a maximum or substantially maximum frequency). Then, when the context manager 107 receives scheduling information from the context platform 103, the context manager 107 can implement the schedule to replace the default high rates of sensing and uploading.

Figure 3:
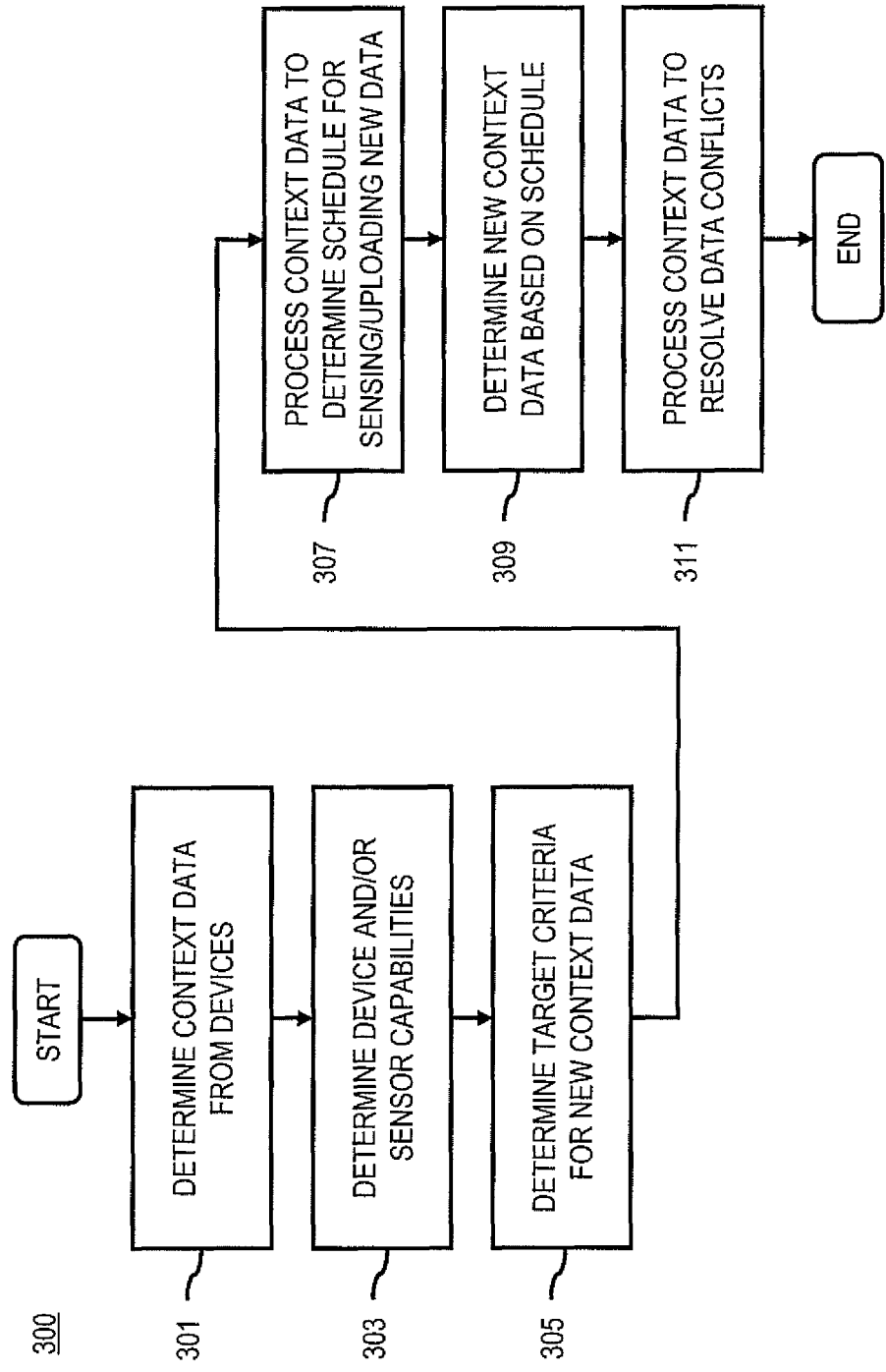
FIG. 3 is a flowchart of a process for providing collaborative context data sensing and communications, according to one embodiment.

FIG. 3 is a flowchart of a process for providing collaborative context data sensing and communications, according to one embodiment. In one embodiment, the context platform 103 performs the process 300 and is implemented in, for instance, a chip set including a processor and a memory as shown FIG. 8. In addition or alternatively, the context manager 107 can perform all or a portion of the process 300.

In step 301, the context platform 103 determines context data from a plurality of devices (e.g., UEs 101). In one embodiment, this initial set of context data can be received or collected from any number of participating UEs 101. As described above, the context data can be collected at this stage using a default sensing and/or uploading rate (e.g., a default high or substantially maximum rate). In other words, the context data are sensed, transmitted, or a combination thereof by the plurality of devices at one or more predetermined rates prior to the determination of scheduling information for collaborative context data sensing. In one embodiment, the one or more predetermined rates are substantially maximum rates of sensing, transmitting, or a combination thereof associated with the plurality of devices.

Steps 303 and 305 described processes for obtaining additional information for processing the context data to determine scheduling information. In step 303, the context platform 103 can determine one or more capabilities of the plurality of UEs 101 and/or their sensors 109 and/or 111. In one embodiment, the one or more capabilities can be determined by analysis of the context data. For example, the range, accuracy, sensitivity, etc. of the data can indicate one or more capabilities of the device. The capabilities can be also related to operational capabilities of UE 101, such as energy left in the battery, memory or processing capacity available for the context sensing task. For example, the UE 101 may be heavily used for other tasks so that the UE 101 can only provide context data with low frequency. The capabilities can then be used, at least in part, in determining a schedule for collaborative context sensing.

In step 305, the context platform 103 can also determine one or more target criteria or data requirements for collection of additional or subsequent context data. By way of example, the target criteria may relate to data quality including, at least in part, a fidelity, a freshness, a granularity, a sensing frequency, a transmission frequency, or a combination thereof of the context data. The target criteria may also include UE 101 related operational criteria, e.g. the amount of energy left in the battery, the amount of free memory, availability of processing capacity for the context sensing task. The target criteria can then be taken into account when selecting participating UEs 101 and/or determining the scheduling information.

In step 307, the context platform 103 processes and/or facilitates a processing of the context data to determine scheduling information for causing, at least in part, a sensing, a transmission, or a combination thereof of additional context data by at least one of the plurality of devices. More specifically, the context platform 103 processes the context information, the one or more capabilities of the devices or sensors, the target criteria, and/or any other relevant factors to select candidate UEs 101 for collecting additional context data and then to generate the schedules for the selected candidates. For example, the context platform 103 processes and/or facilitates a processing of the one or more capabilities to determine the sensing frequency, the transmission frequency, or a combination thereof for determining the scheduling information.

In one embodiment, the context platform 103 generates the scheduling to ensure that the fidelity or quality of the context and/or sensor data meet the target criteria and/or requirements while minimizing the number of UEs 101 participating in the sensing and/or uploading. For example, the context platform 103 can match the device or sensor capabilities and the target data requirements to determine which of the UEs 101 can collaboratively meet those requirements. For example, if the target data requirement is outside the operation range of a sensor (e.g., a temperature range of a thermometer sensor of a UE 101 does not include a target temperature), then the UE 101 is not selected or scheduled to participate in the collaborative context sensing. As another example, a UE 101 may not be selected if its energy situation is bad and it cannot be expected to report context sensing data long enough.

In step 309, the context platform 103 then determines or other receives context data collected in accordance with the generated schedule. By way of example, the context platform 103 can distribute the schedule to participating or candidate UEs 101, which then implement the schedule to collect the transmit the context data to the context platform 103 accordingly.

In step 311, after collecting the context data, the context platform 103 processes and/or facilitates a processing of the context data to determine whether there are not potentially conflicting or outlying data. For example, the context platform 103 can apply one or more data filters to exclude some data while selecting other data for use. In one embodiment, the context platform 103 can exclude context data from UEs 101 which are uploading invalid context data. For example, some data can be regarded as invalid if they are out of a reasonable range expected or previously observed for a given sensor type, context, and/or environmental condition.

In some embodiments, the context platform 103 can detect when UEs 101 leave or join the population devices analyzed in the processes described above. If there are any changes in the devices, the context platform 103 can cause a reevaluation and redetermination of the scheduling information to account the newly arrived or leaving UEs 101.

Figure 4:
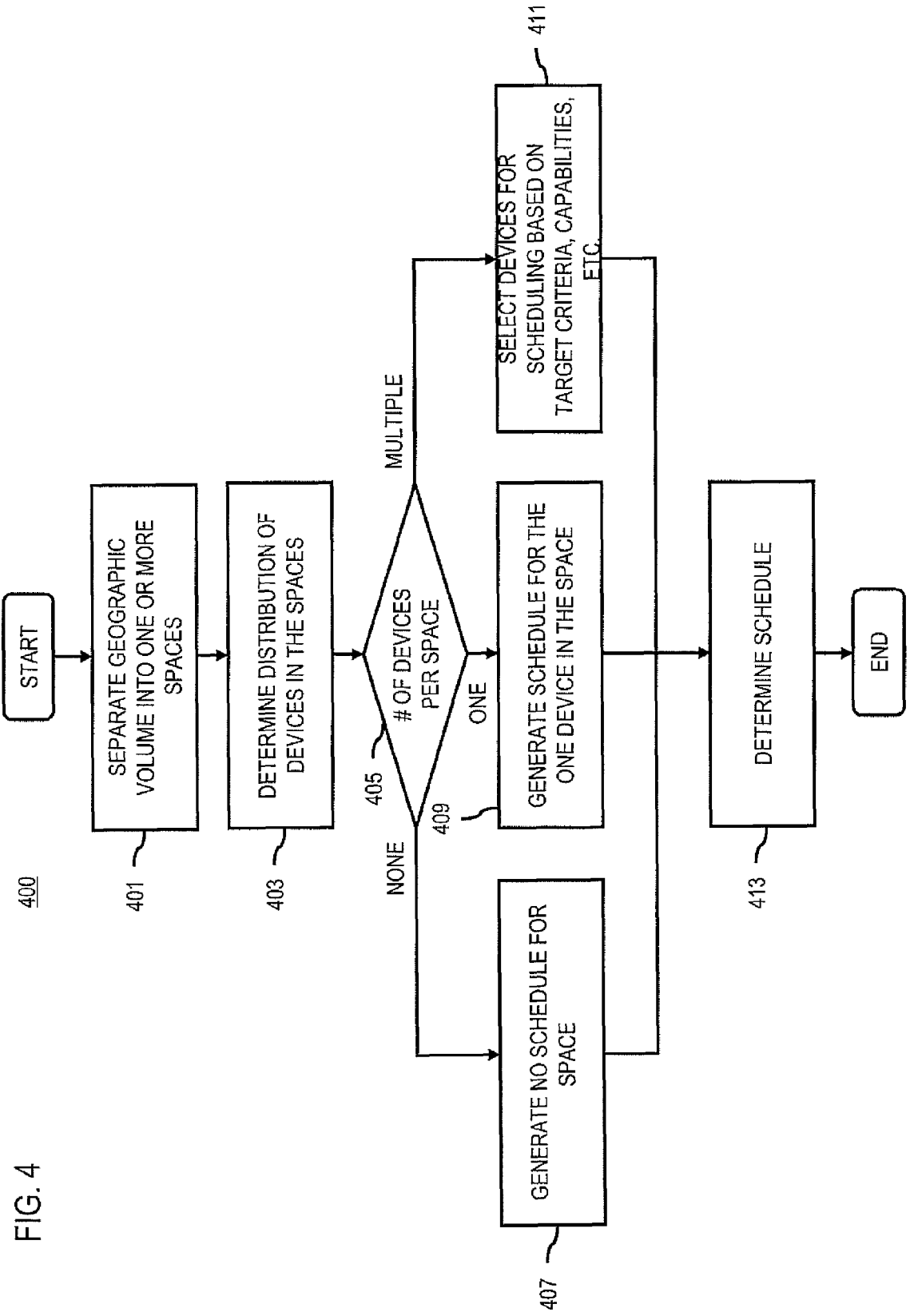
FIG. 4 is a flowchart of a process for determining spaces for providing collaborative context data sensing and communications, according to one embodiment.

FIG. 4 is a flowchart of a process for determining spaces for providing collaborative context data sensing and communications, according to one embodiment. In one embodiment, the context platform 103 performs the process 400 and is implemented in, for instance, a chip set including a processor and a memory as shown FIG. 8. In addition or alternatively, the context manager 107 can perform all or a portion of the process 400. The process 400 extends the process 300 with the concept of spaces or subspaces.

In step 401, the context platform 103 causes, at least in part, separating of a geographic volume into one or more spaces. For example, the geographical volume or space corresponds to locations of potential data sensing targets. As described above, the context platform 103 can subdivide a given region or volume of space into one or more subspaces such as a series of cubes of potentially varying sizes. The sensing targets can then be mapped over the subspaces. In one embodiment, the sizes of the subspaces or cubes are varied to determine a granularity for collecting the context data. In one embodiment, the context platform 103 separates the volume into subspaces or cubes so that the context data sensed and uploaded by any mobile device in the subspace or cube is able to meet target data requirements regarding the granularity of the context data.

In step 403, the context platform 103 determines presence information (e.g., a distribution) of a plurality of devices (e.g., UEs 101) with respect to the one or more spaces. For example, for each defined subspace or cube, the context platform 103 determines context information (e.g., location information) of the UEs 101 to determine which cube or subspace they appear. The context platform 103 can then determine the collaborative data sensing scheduling information separately for the one or more subspaces or cubes.

Accordingly, in step 405, the context platform 103 determines the number of devices in the cubes or subspaces. In step 407, the context platform 103 determines that the presence information indicates that at least one of the one or more spaces includes none of the plurality of devices. For any subspace or cube without a UE 101, the context platform 103 does nothing and generates no scheduling information (step 407).

In step 409, the context platform 103 determines that the presence information indicates that at least one of the one or more spaces includes only one of the plurality of devices. For any subspace or cube with only one UE 101, the context platform 103 selects that device as a candidate device and determines to generate the scheduling information for that one device for sensing the context data in the at least one of the one or more spaces.

In step 411, the context platform 103 determines that the presence information indicates that at least one of the one or more spaces includes multiple ones of the plurality of devices. In this case, the context platform 103 causes, at least in part, a selection of one or more of the multiple ones of the plurality of devices to generate the scheduling information. For example, if there are multiple mobile devices whose highest sense and upload frequency is higher than the target frequency, one of them is selected as the candidate in a random or optimal way. Otherwise, the context platform 103 selects some mobile devices as candidates so that the sum of their highest sense and upload frequency is higher than the target frequency.

In step 413, the context platform 103 calculates the schedule (e.g., sense and upload frequencies) based on the number of determined devices for the one or more subspaces or cubes. In one embodiment, for any subspace cube with one candidate device, the context platform 103 generates scheduling information to set the candidate device's sense and upload frequency as no higher than its highest sense and upload frequencies and the target frequencies. In another embodiment, for any subspace or cube with multiple candidate devices, the context platform 103 generates scheduling information to set the candidate devices' sense and upload frequencies so that the sum of their sense and upload frequencies is larger than or equal to the target frequency. In addition, each candidate device's scheduled sense and upload frequencies are no higher than their maximum frequencies as determined by their capabilities.

FIGS. 5A and 5B are diagrams of user interfaces utilized in the processes of FIGS. 3 and 4, according to various embodiments. FIG. 5A presents a user interface 500 to enable users to select what types of context data to report as part of the collaborative context data sensing. As shown, the user interface 500 indicates that the user has selected to share location, temperature, light, humidity, and $CO_2$ sensor data. Accordingly, the corresponding device (e.g., a UE 101) will be scheduled by the context platform 103 to participate collaboratively in sensing only the selected parameters.

FIG. 5B presents a user interface 520 for users to configure parameters or settings for participating in collaborative data sensing. For example, the user interface provides options for selecting the minimal upload period for the device, as well as the address information for contacting the context platform 103 or other component that is coordinating the collaborative data sensing session. For example, if the address and port correspond to the context platform 103, the collaborative data sensing can be server based. In addition or alternatively, if the address and port points to a peer device (e.g., another UE 101), the collaborative data sensing can be mediated using peer-to-peer protocols.

Figure 6:
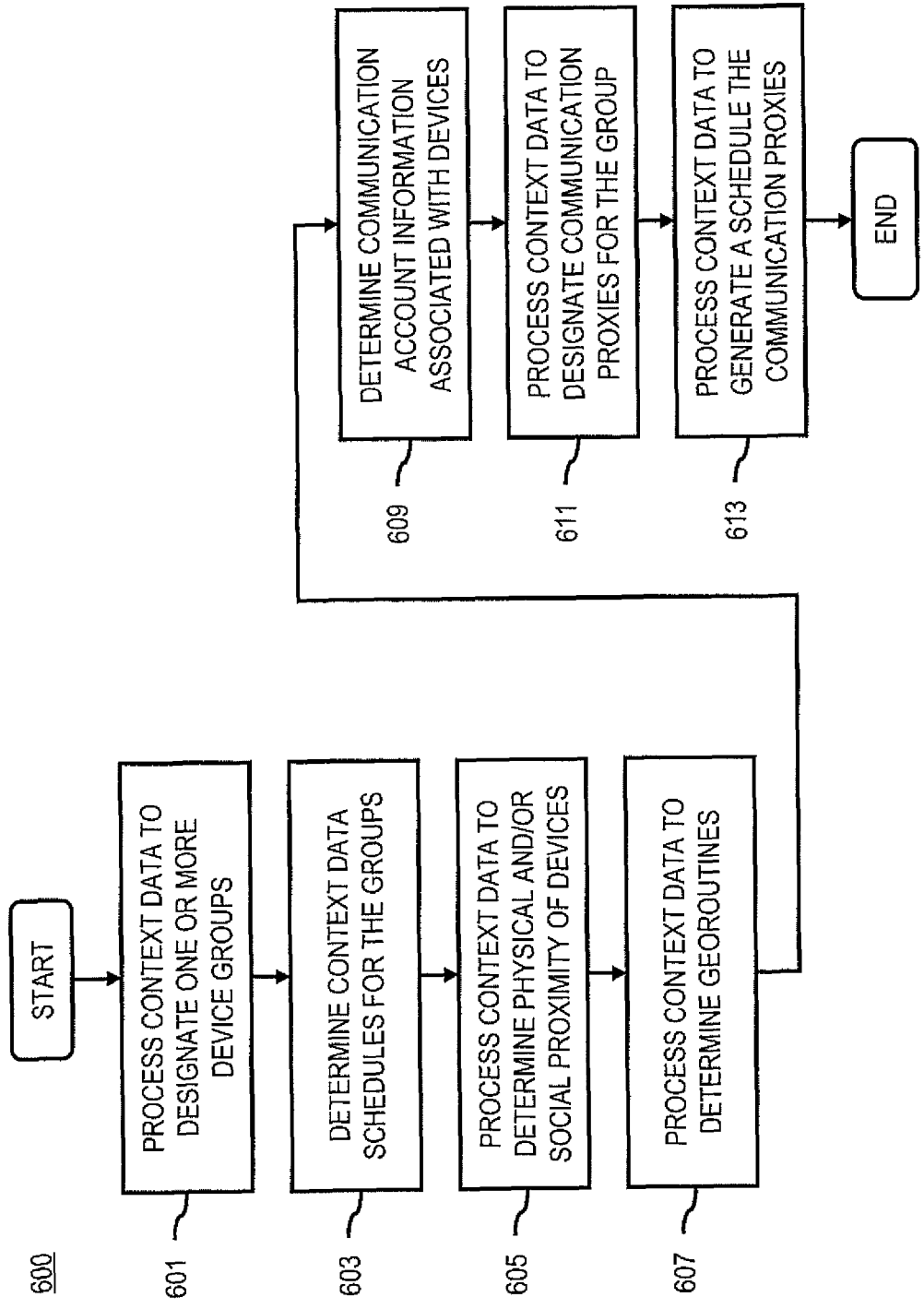
FIG. 6 is a flowchart of a process for using sensed context data to select a communication proxy, according to one embodiment.

FIG. 6 is a flowchart of a process for using sensed context data to select a communication proxy, according to one embodiment. In one embodiment, the context platform 103 performs the process 600 and is implemented in, for instance, a chip set including a processor and a memory as shown FIG. 8. In addition or alternatively, the context manager 107 can perform all or a portion of the process 600.

As described above, the collaborative context sensing process can be used to support a variety of context-aware services. The process 600 describes application of the collaborative context sensing and reporting to an energy efficient communication proxy service 115. It is noted that particularly in developing countries, a large number of mobile device users do not have access to stable electricity supplies and need to physically transport their devices and/or batteries over large distances to be charged. In typical usage, may be 90% or more of the battery capacity is consumed while the phone is in idle mode, due to the need to maintain the connection to the cellular radio network. It is likely that in many areas in developing countries, the coverage is rather poor and therefore the consumption would be even higher. Consequently, many people keep their phone switched off in order to conserve power. Regardless of the type of market, most people sleep several hours a day and the phone could be switched off during that time, thus changing some 20-30% of the idle time into switched off time. However, currently the user would be completely unreachable during that time and this would be perceived as a reduced quality of service.

Furthermore, mobile phones consume much of their battery capacity simply by being switched on and connected to the cellular network. One way to reduce such energy consumption is to deactivate the phone when it is not in active use. The problem in this case is that the user cannot receive connection attempts from other users or from services. Therefore, there needs to be a mechanism that allows the phone to turn itself off and then back on when there is such incoming connections. In the case of other users whose devices may also be deactivated most of the time, the mechanism has to make sure that both devices are active at the same time. The communication proxy service 115 addresses this problem, at least in part, by providing a coordinated sleeping pattern among a group of devices to reduce energy consumption while maximizing the accessibility of the users of the devices.

In addition, the communication proxy service 115 can also provide for delegation of at least part of the device communication functions (e.g., a phone function) to a proxy device. The process 600 describes various embodiments of an approach for designating one or more communication proxy devices based, at least in part, on sensor data obtained through the various embodiments of the collaborative context data sensing described herein. When a proxy is assigned, communication session service connections are directed to the designated proxy device (e.g., a scheduled call). Some considerations regarding proxy assignment, with respect to the one embodiment, are presented below:

Proxy assignment is especially useful when the proxy is a multi-user device—i.e., products that can be used by multiple individuals who authenticate themselves separately to a common device yet have their own private settings and storage within the device.

The server may forward a duplicate of the service connection to the proxy device (e.g. a copy of an SMS).

The server may send metadata associated with the establishment of a service connection to the proxy device (e.g. indication that someone's status has changed in a social networking service, but omitting the identity of the person).

The server may further minimize the total amount of proxy devices employed by recommending the nearest already active proxy device used by other devices within the same network proximity (e.g., commonly grouped devices). The context platform 103 may also balance the load over time by cycling the proxy responsibility among devices in a group that have previously used each other as proxies.

When the selected proxy device includes a low energy consumption local connectivity mechanism, the first device can deactivate all other functions except its local radio. As such, upon receipt of a connection request at the prescribed wake-up time, the assigned proxy sends a wake-up request over the local radio, and the first device would wake up and receive the connection.

As another means of conserving energy with respect to the aforementioned, the proxy device could execute the alarm function on behalf of the first device that first device engages in boot up, therefore reducing latency of executions during the communication session with the second device. The proxy device could even start the connection on behalf of the first device, as it boots up, and then hand over the session when the first device has finally booted. All of these approaches reduce redundancy of execution, which is helpful for the health of the network and the battery life of the user device.

In step 601, the context platform 103 causes, at least in part, a designation of at least one group comprising at least a subset of the plurality of devices based, at least in part, on the collaborative context data. By way of example, the at least one group can be formed to use the communication proxy service 115 to establish communication proxy relationships among one or more of the group devices. In one embodiment, the context platform 103 processes and/or facilitates a processing of the context data to determine, at least in part, location information associated with the plurality of devices, wherein the designation of the at least one group is based, at least in part, on the location information. The context platform 103 then determines a schedule for collecting additional context data from among the group members to facilitate the communication proxy service 115 (step 603).

The devices within the group then begin generating collaboratively sensed context data as described above. In one embodiment, at least a portion of the context data (e.g., location information) is sensed over a short range wireless ad-hoc mesh network that employs low-power non-cellular radios to conserve energy. In one embodiment, the context data includes "awareness information" which refers to any information and/or context about a local environment as well as the users and communication devices within the local environment. By way of example, awareness information can be used to support applications for creating social networks, determining presence, determining contexts associated with a device, advertising, searching for information, etc.

In one embodiment, the ad-hoc mesh network is, for instance, a connectionless and serverless device-to-device network (e.g., a mobile ad-hoc network (MANET)) created using short-range radio technology (e.g., wireless local area network (WLAN) or Bluetooth®). Within the ad-hoc mesh network, each wireless node (e.g., UE 101) may be mobile and is within communication range of any number of other wireless nodes. As used herein, the term "connectionless"

refers to the ability of a node to send and of all surrounding nodes to receive awareness information without the need to send any prior control signaling. For example, sending awareness information using a transmission control protocol/Internet protocol (TCP/IP) over a WLAN ad-hoc is not connectionless because of the two-way TCP control signaling between the sending and receiving nodes used to establish the TCP connection. The awareness information is provided, for instance, in small anonymous messages that are exchanged by the wireless nodes automatically without user intervention. As used herein, the term "anonymous" means that it is not possible to infer the true identity of the sender from the message, unless the true identity is intentionally included in the message (e.g., by the user or another entity authorized by the user).

In one embodiment, the exchange of awareness information occurs as a broadcast message (i.e., a flooding message) from a wireless node to neighboring wireless nodes that are within range of the radio of the broadcasting wireless node. As neighboring wireless nodes receive the broadcasted message, each receiving wireless node 101 may in turn rebroadcast the message to other neighboring wireless nodes 101. In this way, the originally broadcasted message propagates throughout the ad-hoc mesh network 109. In exemplary embodiments, the extent of the propagation may be limited by criteria such as distance, location, time, etc. In addition, proximity information can be determined based on the number hops or links between devices transmitting within the ad hoc mesh network. In one embodiment, the proximity information can be used as part of the context data for the communication proxy service 115.

In step 605, the context platform 103 processes and/or facilitates a processing of the context data to determine or predict a physical proximity of the plurality of devices, a social proximity of one or more users of the plurality of devices, or a combination thereof. For example, with respect physical proximity, the context platform 103 determines relative locations of devices that are connected over the ad-hoc mesh network (or other proximity radios). In one embodiment, the relative locations can be supplemented with other location-based sensor readings (e.g., accelerometers, gyroscopes, compasses, etc.) to increase the accuracy of the determination of the relative locations of devices. In some embodiments, the context platform 103 avoids use of sensors that potentially consume relatively high amounts of energy (e.g., GPS sensors which typically have high energy use) to increase the energy efficiency of the various embodiments described herein. In one embodiment, the physical proximity of the devices is a factor in designation communication proxy devices.

In one embodiment, social proximity can be derived from context data (e.g., user profile) to indicate with respective users of the devices have sufficient or permissible social connections to enable a communication proxy relationship. For example, if a user of the proxied device is a female and resides inside home at the moment, then depending on the local culture it would not be possible for a male proxy device user from outside the home to approach her unless (1) there is a prior consent from a designated device (father, village elder etc.) and/or (2) the device belongs to a priority class (male relative). In another example, if the user of the proxy device is a young person and it is nighttime, then he would not be allowed to go search for the user of the proxied device outdoors unless (1) there is a prior consent from a designated device (father, village elder etc.).

In step 607, the context platform 103 can also process and/or facilitate a processing of the context data to determine one or more georoutines associated with the devices in the group. For example, the context data can be used to determine modes of travel, frequent locations of travel, etc. Additionally, georoutines can capture usual locations (at given times), and routes/durations of usual movements (e.g., as transitions between such locations). In one embodiment, the georoutines can be determined based, at least in part, on the ad-hoc mesh network link/signal/hop data described above. In addition or alternatively, other low power sensors that measure parameters such as the distance, angles, and/or image measurements may be used. It is contemplated that the different types of context data that are indicative of location and/or proximity information can be used in any combination to determine the georoutines of devices in the group. In one embodiment, georoutines are part of the context data considered for determining communication proxy devices.

In step 609, the context platform 103 determines communication account information associated with the plurality of devices, wherein designation of a communication proxy from among the group is based, at least in part, on the communication account information. For example, the communication account information may specify service subscriptions, service levels, and the like. For example, having shared or common account information can be used as a factor for proxy designation. In one embodiment, the communication account information, subscriptions, etc. are also part of the context data considered for determining communication proxy devices.

In step 611, the context platform 103 causes, at least in part, designation of at least one device of the at least one group to act as a communication proxy for one or more other devices of the at least one group. In one embodiment, the context platform 103 determines the local group (e.g., of candidate proxy devices) within which a device should request and/or offer proxy services based on, at least in part, on the physical and/or social proximity information determined above. For example, social proximity can be detected through user communications and/or application (e.g., social networking application) activity. Other considerations for selecting proxy devices include:

- If the user has manually assigned a proxy device, then that unidirectional proxy association is possible also later on, or those two devices can be mutually proxies for each other.
- If the user has manually excluded (blacklisted) a device from being a proxy, then that association is also conserved.
- If the user is having communications (above a specified frequency and cumulative duration of communication sessions) with another local device, then they can proxy each other.
- If the user is detected based on the observed local georoutine (see previously described novelty feature) to be in close physical proximity of another user (above a specified frequency and/or cumulative duration of proximity presence and below a specified distance), then they can proxy each other.
- If the user is determined to be associated with another user through offline means such as customer databases, e.g. due to shared payment of a subscription or a shared address, then they can proxy each other.

Other possible filters or considerations based, at least in part, on the present context data or information of the devices. For example, in one sample use case, if the user of the proxy device is measured to move at speeds of up to 3 m/sec (e.g., based on GPS and/or accelerometer logs), and the ringing phase of the connection attempt is set to last one minute, then the proxied device must be within a radius of a maximum of 150 meters (when taking into account delays to identify proxy device user identity and location, and obstructions en route to that user).

In another embodiment, the context platform 103 can select proxy devices based, at least in part, on observed routine behaviors (e.g., the georoutines described above) or agreed connection agreements (e.g., the coordinated sleep/wake pattern noted above). For example, if the proxied device has a connection agreed at three hours from now, but the user wants to conserve energy, a proxy device will be determined based, at least in part, on the predicted context of the proxy device three hours from now, even if the proxy device's present context would not satisfy criteria for selection as a proxy.

In yet another embodiment, the context platform 103 can use context data such as connection status information with respect to the ad-hoc mesh network to select proxy devices and/or otherwise manage the selection of proxy devices. One use case is for time synchronization among devices in the proxy group. For example, current mobile devices often suffer from clock inaccuracies such as clock drive, which can potentially affect proxy connections dependent on time synchronization. In one embodiment, where absolute time is not necessary, the georoutines information described above can be used in conjunction with activity recognition to adjust the internal clock of group devices (e.g., when a device is in a certain location, the clock is adjusted to the devices within the local proximity). For example, a device can request the calibrated time used in a given ad-hoc mesh network group on entering the group. In this way, the context platform 103 can enable dynamic allocation or designation of proxy devices based, at least in part, on "the last sighting" of the proxied device(s). In other words, when a connection attempt comes to a gateway device (e.g., a proxy device), instead of the user of that device physically attempting to reach the intended proxied device, the proxy responsibility is temporarily forwarded to that device of the ad-hoc mesh network group that had the most recent link to another, now disconnected group, where the proxied device was reachable.

In yet another embodiment, the above embodiment may be combined with context data showing recent mobility information. For example, if the relative position of the device that had the most recent link has changed so that another device is actually now closer to the position where the link was lost, then that other device will be a temporary proxy. In one embodiment, a family of proxy devices can determine a pattern of waking up during a future period of time. For example, five family members will be together in the morning can determine a common time for waking up their otherwise turned off/proxied handsets. In another embodiment, the common wake time can be explicitly set by all the family members or by a subset of them (e.g., parents define the time, and then children's phone will automatically be updated via local ad-hoc mesh network). Alternatively, the wake up time can be set by an internal logic such as waking on up automatically at lunch time or when the children is expected to arrive home. In some embodiments, if local agreement on a wake up time is not possible, the users can choose to update an operator managed timetable.

In step 613, the context platform 103 processes and the context data to generate a schedule for the one or more designated devices to act as communication proxies. For example, the schedule can instruct a device owner or user of an optimal geographical location and time allowing power efficient infrastructure network independent connectivity.

In yet another embodiment, the context platform 103 and/or the communication proxy service 115 can determine when a device is not proxied and needs to establish its own connection to the network 105. By way of example, this situation may arise in the following situations: (1) when the local ad-hoc mesh network link to the proxy device is broken or unavailable and a new proxy device is note immediately found; (2) when explicitly instructed by a user; (3) when determined by the network operator for certain reasons; and the like.

In one embodiment, for mutual decision making with respect to determination of a proxy device it is sufficient that one node is aware of state of all of the devices. For example, the devices send a message of their state (e.g., battery, compensation willingness etc.) to the current gateway or proxy node, who then calculates the next gateway or proxy device. In one embodiment, the current proxy informs the server and this next gateway device of the selection. The rest of the devices in the group can then go offline. When the devices wake up next time, they query through local ad-hoc mesh network the servicing gateway or proxy node. This embodiment is, for instance, resilient against anomalies occurring to the gateway or proxy node during the off-line period. For example, no energy is wasted in informing the designated gateway node (e.g., which might not be reachable at the time) prior to the off-line period because the information does not go stale.

In another embodiment, the mutual decision making can avoid the message exchange taking place each time the gateway device changes. For example, when entering a group, a node could announce its parameters, which the others (or just the current gateway node) take into account when calculating the next gateway node (without sending messages). In one embodiment, only in case parameters change in an unanticipated manner (e.g., remaining battery power cannot be extrapolated with enough accuracy) the given node needs to update its information to others.

In another embodiment, resilience can be improved further by having a designated back-up gateway device to the primary gateway node, which by default does not exchange messages with the infrastructure network. In one embodiment, in case the primary gateway device is unable to fulfill its function, the back-up device takes over. By way of example, the required resources are much less than for the primary device, e.g., the device could remain idle and wake up with higher frequency compared to rest of the idle nodes in the group to check that the primary gateway is still functional.

The processes described herein for providing collaborative context data sensing and communications may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
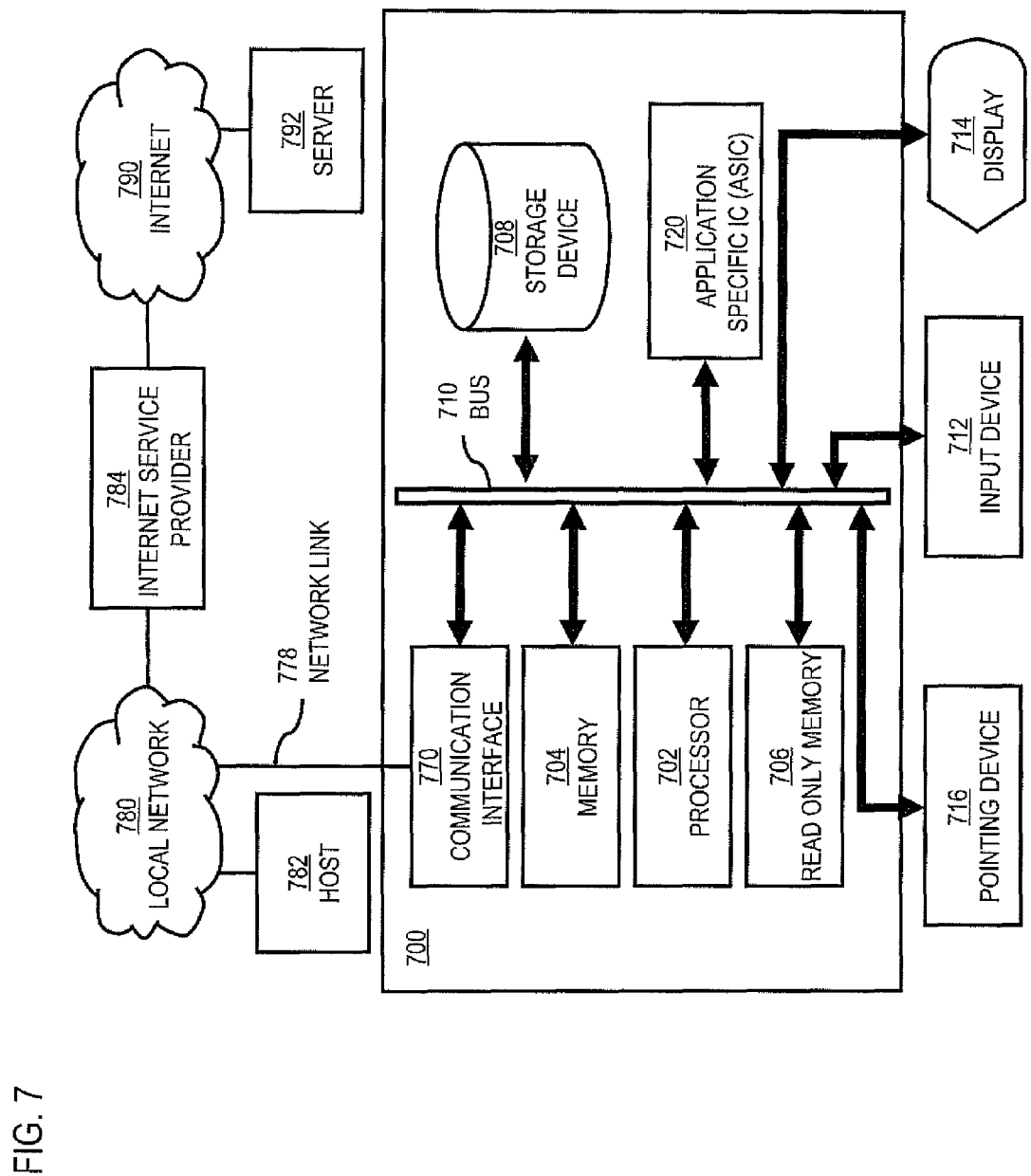
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide collaborative context data sensing and communications as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing collaborative context data sensing and communications.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing collaborative context data sensing and communications. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing collaborative context data sensing and communications. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing collaborative context data sensing and communications, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing collaborative context data sensing and communications.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
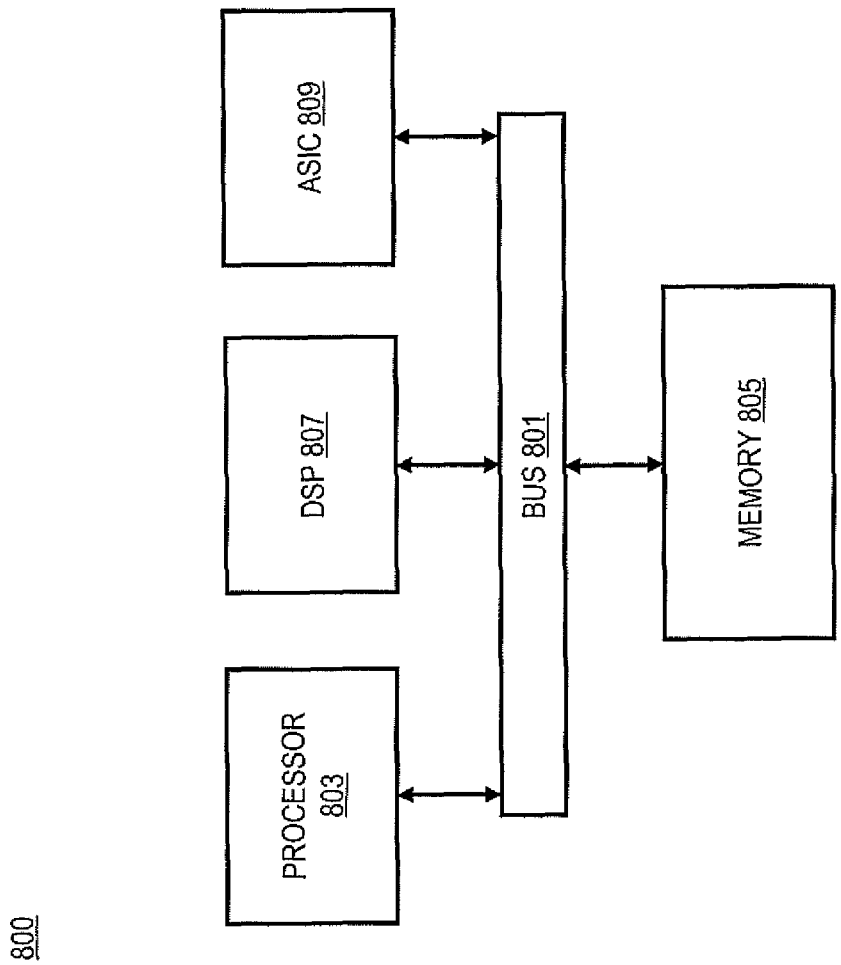
FIG. 8 is a diagram of a chip set that can be used to implement an embodiment of the invention.

FIG. 8 illustrates a chip set or chip 800 upon which an embodiment of the invention may be implemented. Chip set 800 is programmed to provide collaborative context data sensing and communications as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing collaborative context data sensing and communications.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide collaborative context data sensing and communications. The memory 805 also stores the data associated with or generated by the execution of the inventive steps.

Figure 9:
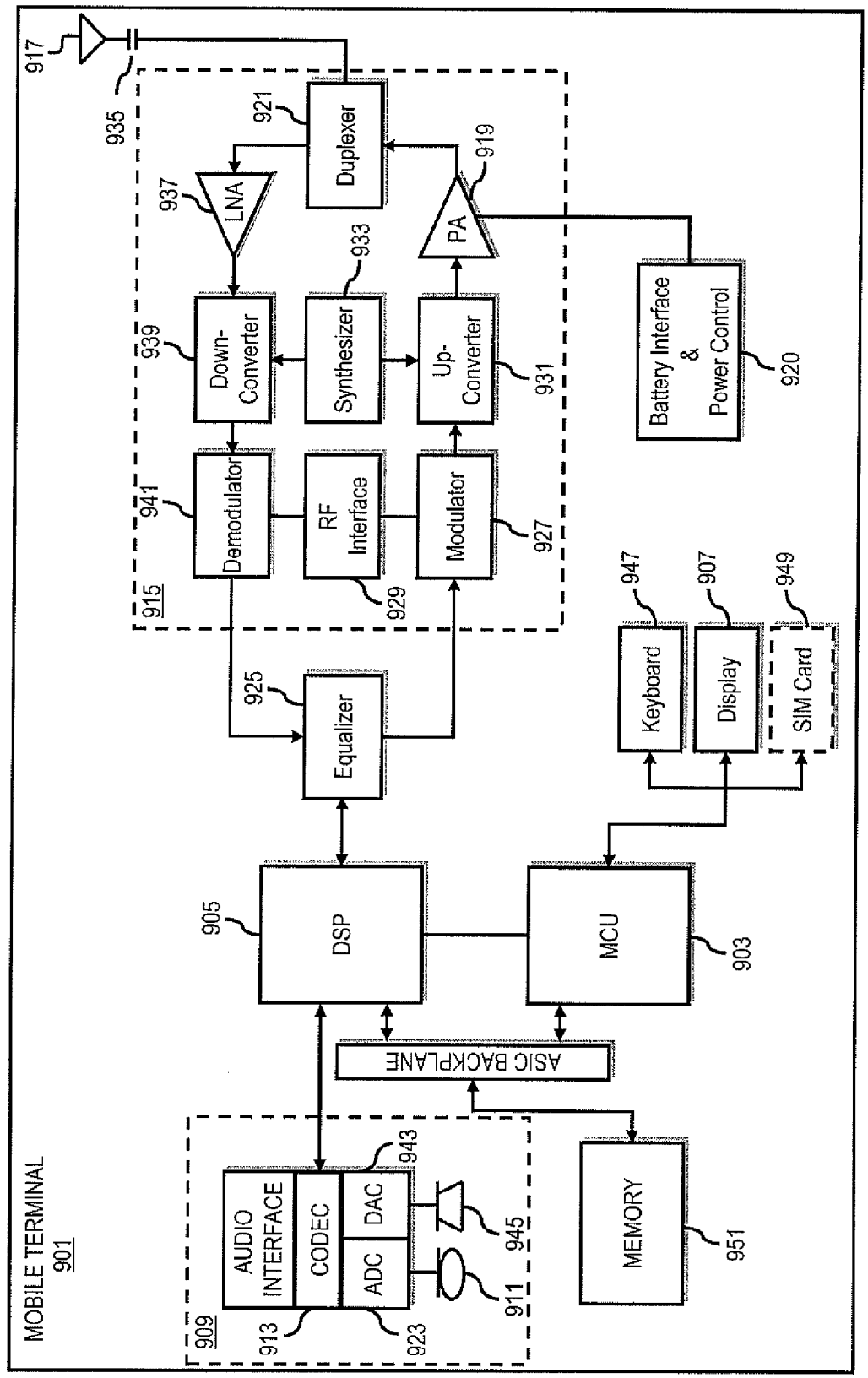
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing collaborative context data sensing and communications. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing collaborative context data sensing and communications. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide collaborative context data sensing and communications. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus comprising:
   at least one processor; and
   at least one memory including computer program code for one or more programs,
   the at least one memory and the computer program code configured to, with the at least one processor, cause the apparatus to perform at least the following,
      determine context data from a plurality of devices;
      facilitate processing of the context data to determine scheduling information for, at least in part, causing a sensing, causing a transmission, or a combination thereof of additional context data by at least one of the plurality of devices;
      determine the additional context data based, at least in part, on the scheduling information;
      cause separation of a geographic volume into one or more spaces;
      determine presence information of the plurality of devices with respect to the one or more spaces, wherein the scheduling information is further based, at least in part, on the presence information and the scheduling information is determined separately for the one or more spaces; and
      determine that the presence information indicates that at least one of the one or more spaces includes none of the plurality of devices.

2. An apparatus of claim 1, wherein the apparatus is further caused to:
   determine one or more target criteria for the additional context data,
   wherein the scheduling information is further based, at least in part, on the one or more target criteria, wherein the one or more target criteria include, at least in part, a fidelity, a freshness, a granularity, a sensing frequency, a transmission frequency, or a combination thereof and wherein the apparatus is further caused to:
   determine one or more capabilities of the plurality of devices for acquiring the target criteria; and
   facilitate processing of the one or more capabilities to determine the sensing frequency, the transmission frequency, or a combination thereof,
   wherein the scheduling information is based, at least in part, on the frequency of the sensing, the frequency for transmission, or a combination thereof.

3. An apparatus according to claim 1, wherein the context data is sensed, transmitted, or a combination thereof by the plurality of devices at one or more predetermined rates prior to the determination of the scheduling information and wherein the one or more predetermined rates are substantially maximum rates of sensing, transmitting, or a combination thereof associated with the plurality of devices.

4. An apparatus according to claim 1, wherein the apparatus is further caused to:
   determine not to generate the scheduling information for the at least one of the one or more spaces;
   determine that the presence information indicates that at least one of the one or more spaces includes only one of the plurality of devices;
   determine to generate the scheduling information for the only one of the plurality of devices for sensing the context data in the at least one of the one or more spaces;
   determine that the presence information indicates that at least one of the one or more spaces includes multiple ones of the plurality of devices and cause, at least in part, a selection of one or more of the multiple ones of the plurality of devices to generate the scheduling information.

5. An apparatus according to claim 1, wherein the apparatus is further caused to:
facilitate processing of the context data, the additional context data, or a combination thereof to determine one or more data conflicts; and
cause, at least in part, an application of one or more data filters to resolve the one or more data conflicts.

6. An apparatus according to claim 1, wherein the apparatus is further caused to:
cause, at least in part, a designation of at least one group comprising at least a subset of the plurality of devices based, at least in part, on the context data,
wherein the scheduling information is generated for the at least one group.

7. An apparatus of claim 6, wherein the apparatus is further caused to:
process and/or facilitate a processing of the context data, the additional context data, or a combination thereof to determine, at least in part, location information associated with the plurality of devices,
wherein the designation of the at least one group is based, at least in part, on the location information, the location information is sensed over a short range wireless ad-hoc mesh network, and the location information is sensed via one or more sensors associated with the plurality of devices.

8. An apparatus according to claim 7, wherein the apparatus is further caused to:
cause, at least in part, another designation of at least one device of the at least one group to act as a communication proxy for one or more other devices of the at least one group;
process and/or facilitate a processing of the context data, the additional context data, or a combination thereof to determine other scheduling information for the at least one device to act as the communication proxy,
wherein the another designation of the at least one device as the communication proxy is a unidirectional designation or a mutual designation; and
determine communication account information associated with the plurality of devices,
wherein the another designation of the at least one device as the communication proxy is further based, at least in part, on the communication account information;
process and/or facilitate a processing of the context data, the additional context data, or a combination thereof to determine a physical proximity of the plurality of devices, a social proximity of one or more users of the plurality of devices, or a combination thereof,
wherein the another designation of the at least one device as the communication proxy is based, at least in part, on the physical proximity, the social proximity, or a combination thereof; and
process and/or facilitate a processing of the context data, the additional context data, or a combination thereof to predict the physical proximity, the social proximity, or a combination thereof.

9. An apparatus according to claim 1, wherein the apparatus is further caused to:
determine that one or more other devices have joined or left the plurality of devices; and
cause, at least in part, a redetermination of the scheduling information.

10. An apparatus according to claim 1, wherein the apparatus is a mobile phone further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

11. A method comprising:
determining context data from a plurality of devices;
processing the context data to determine scheduling information for, at least in part, causing a sensing, causing a transmission, or a combination thereof of additional context data by at least one of the plurality of devices;
determining the additional context data based, at least in part, on the scheduling information;
causing separation of a geographic volume into one or more spaces;
determining presence information of the plurality of devices with respect to the one or more spaces,
wherein the scheduling information is further based, at least in part, on the presence information and the scheduling information is determined separately for the one or more spaces; and
determining that the presence information indicates that at least one of the one or more spaces includes none of the plurality of devices.

12. A method of claim 11, further comprising:
determining one or more target criteria for the additional context data,
wherein the scheduling information is further based, at least in part, on the one or more target criteria and the one or more target criteria include, at least in part, a fidelity, a freshness, a granularity, a sensing frequency, a transmission frequency, or a combination thereof;
determining one or more capabilities of the plurality of devices for acquiring the target criteria; and
processing the one or more capabilities to determine the sensing frequency, the transmission frequency, or a combination thereof,
wherein the scheduling information is based, at least in part, on the frequency of the sensing, the frequency for transmission, or a combination thereof.

13. A method according to claim 11, wherein the context data is sensed, transmitted, or a combination thereof by the plurality of devices at one or more predetermined rates prior to the determination of the scheduling information and wherein the one or more predetermined rates are substantially maximum rates of sensing, transmitting, or a combination thereof associated with the plurality of devices.

14. A method according to claim 11, further comprising:
determining not to generate the scheduling information for the at least one of the one or more spaces;
determining that the presence information indicates that at least one of the one or more spaces includes only one of the plurality of devices;
determining to generate the scheduling information for the only one of the plurality of devices for sensing the context data in the at least one of the one or more spaces;
determining that the presence information indicates that at least one of the one or more spaces includes multiple ones of the plurality of devices and
causing, at least in part, a selection of one or more of the multiple ones of the plurality of devices to generate the scheduling information.

15. A method according to claim 11, further comprising:
processing the context data, the additional context data, or a combination thereof to determine one or more data conflicts; and
causing, at least in part, an application of one or more data filters to resolve the one or more data conflicts.

16. A method according to claim 11, further comprising:
causing, at least in part, a designation of at least one group comprising at least a subset of the plurality of devices based, at least in part, on the context data,
wherein the scheduling information is generated for the at least one group;
processing and/or facilitating a processing of the context data, the additional context data, or a combination thereof to determine, at least in part, location information associated with the plurality of devices,
wherein the designation of the at least one group is based, at least in part, on the location information,
the location information is sensed over a short range wireless ad-hoc mesh network,
and the location information is sensed via one or more sensors associated with the plurality of devices,
causing, at least in part, another designation of at least one device of the at least one group to act as a communication proxy for one or more other devices of the at least one group;
processing and/or facilitating a processing of the context data, the additional context data, or a combination thereof to determine other scheduling information for the at least one device to act as the communication proxy,
wherein the another designation of the at least one device as the communication proxy is a unidirectional designation or a mutual designation;
determining communication account information associated with the plurality of devices,
wherein the another designation of the at least one device as the communication proxy is further based, at least in part, on the communication account information;
processing and/or facilitating a processing of the context data, the additional context data, or a combination thereof to determine a physical proximity of the plurality of devices, a social proximity of one or more users of the plurality of devices, or a combination thereof,
wherein the another designation of the at least one device as the communication proxy is based, at least in part, on the physical proximity, the social proximity, or a combination thereof;
processing and/or facilitating a processing of the context data, the additional context data, or a combination thereof to predict the physical proximity, the social proximity, or a combination thereof.

17. A method according to claim 11, further comprising:
determining that one or more other devices have joined or left the plurality of devices; and
causing, at least in part, a redetermination of the scheduling information.

18. A non-transitory computer-readable storage medium carrying one or more sequences of one or more instructions which, when executed by one or more processors, cause an apparatus to:
determine context data from a plurality of devices;
facilitate processing of the context data to determine scheduling information for, at least in part, causing a sensing, causing a transmission, or a combination thereof of additional context data by at least one of the plurality of devices;
determine the additional context data based, at least in part, on the scheduling information;
cause separation of a geographic volume into one or more spaces;
determine presence information of the plurality of devices with respect to the one or more spaces, wherein the scheduling information is further based, at least in part, on the presence information and the scheduling information is determined separately for the one or more spaces; and
determine that the presence information indicates that at least one of the one or more spaces includes none of the plurality of devices.

19. A non-transitory computer-readable storage medium according to claim 18 carrying one or more sequences of one or more instructions which, when executed by one or more processors, cause an apparatus to
determine one or more target criteria for the additional context data,
wherein the scheduling information is further based, at least in part, on the one or more target criteria, wherein the one or more target criteria include, at least in part, a fidelity, a freshness, a granularity, a sensing frequency, a transmission frequency, or a combination thereof and wherein the apparatus is further caused to:
determine one or more capabilities of the plurality of devices for acquiring the target criteria; and
facilitate processing of the one or more capabilities to determine the sensing frequency, the transmission frequency, or a combination thereof,
wherein the scheduling information is based, at least in part, on the frequency of the sensing, the frequency for transmission, or a combination thereof.

20. A non-transitory computer-readable storage medium according to claim 18 carrying one or more sequences of one or more instructions which, when executed by one or more processors, wherein the context data is sensed, transmitted, or a combination thereof by the plurality of devices at one or more predetermined rates prior to the determination of the scheduling information and wherein the one or more predetermined rates are substantially maximum rates of sensing, transmitting, or a combination thereof associated with the plurality of devices.

* * * * *